(12) United States Patent
Rosenkranz

(10) Patent No.: US 10,991,378 B2
(45) Date of Patent: Apr. 27, 2021

(54) METHOD FOR REDUCING NOISE IN AN AUDIO SIGNAL AND A HEARING DEVICE

(71) Applicant: SIVANTOS PTE. LTD., Singapore (SG)

(72) Inventor: Tobias Daniel Rosenkranz, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 94 days.

(21) Appl. No.: 16/398,548

(22) Filed: Apr. 30, 2019

(65) Prior Publication Data

US 2019/0333530 A1 Oct. 31, 2019

(30) Foreign Application Priority Data

Apr. 30, 2018 (DE) ..................... 10 2018 206 689.2

(51) Int. Cl.
| | | |
|---|---|---|
| *G10L 21/0232* | (2013.01) | |
| *G10L 21/0224* | (2013.01) | |
| *G10L 21/0264* | (2013.01) | |
| *G10L 15/26* | (2006.01) | |
| *G10L 21/0272* | (2013.01) | |

(52) U.S. Cl.
CPC .......... *G10L 21/0232* (2013.01); *G10L 15/26* (2013.01); *G10L 21/0224* (2013.01); *G10L 21/0264* (2013.01); *G10L 21/0272* (2013.01)

(58) Field of Classification Search
CPC ..... G10L 13/02; G10L 15/26; G10L 21/0272; G10L 15/02; G10L 15/14; G10L 2015/025; G10L 25/18; G10L 21/0232; G10L 21/0264; G10L 21/0364; G10L 25/12; G10L 25/84; G10L 15/20; G10L 21/0202; G10L 21/0224; G10L 21/0308; G10L 25/30; G10L 25/93; H04R 2225/43; G10K 11/16; G10K 11/178; G10K 2210/3051
USPC .......... 704/200, 205, 206, 211, 270; 381/10, 381/316, 94.2
See application file for complete search history.

(56) References Cited

U.S. PATENT DOCUMENTS

| | | | |
|---|---|---|---|
| 5,742,694 A | 4/1998 | Eatwell | |
| 8,694,306 B1 * | 4/2014 | Short | G01S 13/88 704/200 |
| 9,443,535 B2 * | 9/2016 | Short | G10L 13/02 |
| 9,495,975 B2 * | 11/2016 | Short | G01S 13/88 |
| 10,319,361 B2 * | 6/2019 | Clemow | G10K 11/17875 |
| 2001/0005822 A1 * | 6/2001 | Fujii | G10L 21/0364 704/200 |
| 2015/0092966 A1 * | 4/2015 | Andersen | H04R 25/00 381/316 |
| 2015/0287422 A1 * | 10/2015 | Short | G10L 13/02 704/205 |
| 2017/0004841 A1 | 1/2017 | Jensen | |
| 2017/0061978 A1 * | 3/2017 | Wang | G10L 21/0232 |
| 2017/0103746 A1 * | 4/2017 | Clemow | G10K 11/17873 |

(Continued)

*Primary Examiner* — Vijay B Chawan
(74) *Attorney, Agent, or Firm* — Laurence A. Greenberg; Werner H. Sterner; Ralph E. Locher

(57) ABSTRACT

A method reduces noise in an audio signal. In the method a signal component subsequent to the prediction time is predicted for a plurality of prediction times with reference to signal components of the audio signal that are respectively prior to the prediction time. A predicted audio signal is formed from the signal components respectively following a prediction time, and a noise-reduced audio signal is generated based on the predicted audio signal.

9 Claims, 3 Drawing Sheets

(56) References Cited

U.S. PATENT DOCUMENTS

2017/0265010 A1* 9/2017 Kavalekalam ....... H04R 25/552
2017/0272869 A1   9/2017 Salvetti et al.
2018/0109886 A1* 4/2018 Nielsen ............... H04R 25/407

* cited by examiner ical application DE 10 2018 206 689.2, filed Apr. 30, 2018; the prior application is herewith incorporated by reference in its entirety.

METHOD FOR REDUCING NOISE IN AN AUDIO SIGNAL AND A HEARING DEVICE

CROSS-REFERENCE TO RELATED APPLICATION

This application claims the priority, under 35 U.S.C. § 119, of German application DE 10 2018 206 689.2, filed Apr. 30, 2018; the prior application is herewith incorporated by reference in its entirety.

BACKGROUND OF THE INVENTION

Field of the Invention

The invention relates to a method for reducing noise in an audio signal.

In many audio applications, particularly when processing microphone signals, noise is generated that needs to be reduced in the application context. In most cases, noise that is often difficult to specify is superimposed on a useful signal that is actually desired. At times, the noise may even have a considerable impact on the perceptibility of the signal.

In hearing devices, the useful signal often consists of the speech signal of a conversation partner of the hearing device user. The background noise of the environment, which is likewise picked up by the microphones of the hearing device and then correspondingly processed, may disturb or distract the user, so that the user must use substantially more effort, and in particular more concentration, to recognize the partner's speech contributions. To reduce noise, many hearing devices split an internal signal of the hearing device into different frequency bands, and reduce the signal by an amplification factor for those frequency bands in which a particularly high noise component is detected.

However, because the respective amplification factor is uniform across the respective frequency band, the described procedure treats all signal components in a given frequency band the same. Thus, if in a particular frequency band, a considerable amount of noise is superimposed on a high proportion of the useful signal component that is actually desired, the described method also attenuates the useful signal component due to the reduced amplification factor that accompanies the high noise component. Accordingly, this type of noise reduction may actually degrade the signal-to-noise ratio (SNR).

In many cases, the desired useful signal is provided as a speech signal. This signal is characterized by a particular harmonic structure of the individual signal components. As a result of this harmonic structure, noise reduction between two harmonic components of the speech signal would require filtering the entire audio signal with a frequency resolution that maps the various harmonic components into different frequency bands, which are preferably non-adjacent. However, such a high frequency resolution, given the usual frequencies and frequency spacings for the harmonic components, is undesirable in hearing devices due to the high latencies that result, and the corresponding time delay in signal processing.

SUMMARY OF THE INVENTION

The objective of the invention is therefore to provide a method for reducing noise in an audio signal that provides the best possible SNR, particularly for a tonal useful signal on which noise is superimposed.

This problem is solved according to the invention by a method for reducing noise in an audio signal, in which a signal component subsequent to the prediction time is predicted for a plurality of prediction times in each case with reference to signal components of the audio signal before the prediction time, wherein a predicted audio signal is formed from the signal components that respectively follow a prediction time, and wherein a noise-reduced audio signal is generated with reference to the predicted audio signal. Advantageous configurations that are in part inventive in themselves are the subject matter of the dependent claims and the following description.

In particular, the noise-reduced audio signal is generated with reference to the predicted audio signal by mixing or superimposing the predicted audio signal with the audio signal, or with preprocessed signal components of the audio signal, and the preprocessing in particular contains a frequency-band-dependent amplification.

A prediction time is understood here in particular as a point in time in the context of the time reference of the audio signal. This means that signal components prior to the prediction time have an earlier time reference, and signal components subsequent to the prediction time have a later time reference. The plurality of prediction times for which subsequent signal components are predicted thus form a temporal sequence in the context of the time reference of the audio signal.

The prediction times, and the signal components to be predicted after a respective prediction time, are preferably selected in such a way that these signal components cover the full time span to the next prediction time, i.e. that a predicted signal component may be associated with each individual time point up to the next prediction time, which is predicted on the basis of the signal components before the current last prediction time. In particular, this assignment may also be discretized so that an audio sample coexists at any time after the prediction time, which represents the relevant time reference.

In particular, the predicted audio signal may also be formed in such a way that signal components that are predicted for a specific time reference are used at a plurality of prediction times. If the prediction is made, for example, via individual audio samples as signal components, a corresponding audio sample of the predicted audio signal may be formed at a specific time reference by a weighted averaging of a plurality of audio samples of the same time reference, each predicted at different prediction times. The predicted audio signal is thus formed at a specific time reference as a weighted average of a plurality of overlapping signal components that were each predicted at a different prediction time but all have the same time reference.

In general, individual signal components are used before a prediction time to predict a signal component at and/or after the prediction time. By temporally staggering the prediction times, predicted signal components are obtained, the time references of which preferably adjoin or overlap, so that an independent predicted audio signal may be formed from these signal components according to their respective time reference.

This approach exploits the circumstance that the prediction of future signal components from already existing signal components of the audio signal is based on correlations in the audio signal, and in addition, typical useful signal components in an audio signal usually have a high correlation. Thus, as a general matter, the correlated signal components of the audio signal may be predicted, while uncorrelated components such as statistically distributed noise cannot be predicted. The predicted audio signal thus has a significantly higher proportion of correlated signal components than the original audio signal, which means that an uncorrelated noise component in the audio signal may be suppressed.

It should be noted here that in many applications, the useful signals of an audio signal to be processed are often very strongly correlated. For example, the tonal components of music have a very high correlation, because they consist substantially of a fundamental frequency and the harmonic overtone spectrum that is characteristic of the sound of a tone, this spectrum being formed by integer multiples of the fundamental frequency. The vocal and thus the tonal components of speech also have this harmonic structure in the frequency domain. These fixed frequency components, i.e. the fundamental frequency and the harmonics thereof, lead respectively to a corresponding periodicity of the useful signal component, which is expressed in corresponding correlations of the signal components, as a result of which these useful signal components may be particularly well-captured by the prediction and thus may also be predicted. In the prediction, therefore, uncorrelated noise that is superimposed over these fixed frequency components is reduced.

For signal components of the audio signal prior to a prediction time, a respective plurality of audio samples prior to the prediction time are preferably used. In particular, the audio signal may first be decomposed into individual frequency bands and a plurality of audio samples may be used as the individual signal components for each of the frequency bands in which signal components are to be predicted, in such a way that the plurality of audio samples reproduces the signal component of the audio signal in the relevant frequency band. Particularly preferably in this case, for the signal components, a seamless sequence of audio samples is used that immediately precede the respective prediction time in the audio signal, in the respective frequency band of the audio signal or—in the case of broadband prediction—in the audio signal. The audio samples may then be used to predict the subsequent signal component via an in particular linear, discrete prediction filter. In particular, when selecting the audio samples to be used for a prediction, oversampling of a filter bank that divides the audio signal into individual frequency bands may also be used, so that in one frequency band, the audio samples are selected as signal components that are relevant for the prediction, in such a way that to the extent possible, no correlations are included in the signal components by oversampling unless they are inherent in the original audio signal.

Expediently, a respective number of audio samples is predicted as a signal component subsequent to the prediction time, and this number is associated with a time reference subsequent to that prediction time. In particular, the prediction may be done in a frequency-band-specific manner, so that for those frequency bands in which a prediction is made, respectively different audio samples are generated that have the same time reference subsequent to the prediction time. Preferably, for each relevant frequency band or—in the case of broadband prediction—at a prediction time, only one audio sample is ever predicted, so that each predicted audio sample may always be predicted with reference to the currently most recent audio samples of the audio signal.

Favorably, a linear prediction filter is used to predict the signal component subsequent to a prediction time, with reference to signal components of the audio signal prior to the prediction time. Even if the prediction of the respective signal components may, in principle, also be done differently, a linear prediction filter has the further advantage, in addition to a low numerical complexity and low complexity of implementation, that a linear prediction filter may in particular be adapted dynamically to the circumstances of the existing audio signal. For example, if a plurality of useful signal components is present in the audio signal, the filter length—the number of audio samples to be used and the number of corresponding filter coefficients—may be varied and, in particular, increased. The quality of the prediction, i.e. the "filtering" of the individual useful signal components, may be improved as a result.

In addition, the filter coefficients may be varied individually as a function of the audio signal and the predicted audio signal, so that the prediction filter will always use the optimal filter coefficients. Preferably, in this case, the filter coefficients of the linear prediction filter are determined adaptively as a function of a deviation of the predicted audio signal from the audio signal. For a small deviation, accordingly, a good prediction is present and therefore the "correct" filter coefficients are present. As the deviation increases, the filter coefficients may be varied and adapted accordingly to minimize this deviation.

It is also advantageous if the audio signal is decomposed into a plurality of frequency bands, and a signal component subsequent to the respective prediction time is respectively predicted in a frequency-band-specific manner with reference to the signal components of the audio signal prior to the prediction time. Preferably in this case, the signal components prior to the prediction time that are used for the prediction are respectively used in a frequency-band-specific manner in each of those frequency bands in which any prediction at all is made. In this case, the signal component subsequent to the prediction time is predicted for the respective frequency band with reference to these frequency-band-specific signal components of the audio signal. As a general matter, it may be advantageous to limit the prediction to certain frequency bands only.

If, for example, the useful signal is provided by a speech signal, reducing noise in the predicted audio signal delivers particularly good results, especially in low frequency bands, due to the high correlations of the harmonic components of the speech signal. For higher frequency bands, the components of the speech signal no longer have correlations as high as those of the harmonic components of the lower frequency bands, so that prediction may also suppress useful signal components. The cancellation of important useful signal components in the noise-reduced audio signal may be prevented by using a different method of noise reduction in higher frequency bands. In this case, prediction need not be performed in the higher frequency bands.

Preferably, in this case, in order to generate the noise-reduced audio signal, the predicted audio signal is mixed with signal components of the audio signal in a frequency-band-specific manner, the mixing ratio being determined as a function of the contributions from harmonic components and/or contributions from uncorrelated components in the respective frequency band. In particular, this may take place in the transition range between low frequencies at which the proportion of harmonic components is high, and high frequencies at which there are virtually no harmonic components remaining. The higher the proportion of contributions from harmonic components in a frequency band, in general, with respect to SNR, the better is the noise reduction by means of prediction. In the transition range, harmonic components may coexist with other components, which for example represent voiceless speech such as hard consonants. If the noise-reduced audio signal were formed solely with reference to the predicted audio signal, these non-harmonic components of the useful signal would likewise be reduced in the prediction, as appropriate. Mixing as a function of the harmonic components, as described, allows compensation in this case.

The signal components of the audio signal which are to be mixed with the predicted audio signal may in particular first be subjected to a classical noise reduction by means of noise-dependent, frequency-band-specific amplification factors. If there is a high proportion of uncorrelated components, it may be assumed in particular that these are caused by noise and do not come from the useful signal. Likewise, if there are the contributions from harmonic components are nil or small, it may be preferred to treat the relevant frequency band predominantly by the aforementioned classical noise reduction.

Advantageously, in order to generate the noise-reduced audio signal, the predicted audio signal is mixed with signal components of the audio signal in a frequency-band-specific manner, a respective noise reduction coefficient is applied to the signal components of the audio signal in a frequency-band-specific manner before the mixing, and the noise reduction coefficient in the respective frequency band is determined with reference to a noise reduction that occurs in the predicted audio signal relative to the audio signal. This means that in order to generate the frequency-band-specific, noise-dependent amplification factors for classical noise reduction, the degree of noise reduction that occurs as a result of the prediction is evaluated in the predicted audio signal of the relevant frequency band. The amplification factor of classical noise reduction may now be reduced by the amount of this contribution, because this noise reduction is already achieved by the prediction. The noise reduction achieved through prediction may be estimated, for example, by simply comparing the signal levels of the predicted audio signal and the audio signal in the frequency band, because it is assumed that the noise reduction itself achieves a reduction in signal level.

Expediently, the presence of a number of harmonic components is estimated for a number of frequency bands, and the filter length of the linear prediction filter is selected as a function of the number of harmonic components in the frequency band. In particular in the case of a useful signal in the form of speech, due to the usual distances between harmonic components, which are always integer multiples of a fundamental frequency that is within the frequency range of the audible voice, and due to the usual width of frequency bands, it may happen that two or more harmonic components also fall into one frequency band. In the signal component of the frequency band, these harmonic components are superimposed. A longer filter is preferred for this case. This takes into account the circumstance that the superimposing these harmonic components may result in a more complex periodicity behavior, and for this reason, a longer filter and thus the use of more signal components, for example more audio samples, is advantageous for prediction. If, however, only one harmonic component is present, a smaller number of signal components may suffice for prediction, and the length of the prediction filter may be correspondingly reduced, in order to reduce the complexity of the calculations.

The invention additionally specifies a method for noise reduction for a hearing device, wherein an input sound signal is generated from a sound signal of the environment by an input transducer of the hearing device, a noise in the input signal and/or in an intermediate signal derived from the input signal is suppressed by the aforementioned method for noise reduction in an audio signal, and a playback signal of the hearing device is formed with reference to the resulting noise-reduced signal. The invention also specifies a hearing device with an input transducer for generating an input signal and a signal processing unit that is arranged to carry out the aforementioned method for reducing noise in an audio signal. The advantages indicated for the method and for its refinements may be applied analogously to the method for reducing noise for a hearing device and to the hearing device. In particular, the hearing device is furnished and arranged in order to correct a hearing impairment of a user of the hearing device by correspondingly processing the input signal in the signal processing unit. Preferably, for this purpose, the input signal is amplified in a frequency-band-dependent manner in the signal processing unit, particularly preferably, as a function of an audiogram of the user. The method of reducing noise in an audio signal is particularly advantageous when used in such a hearing device.

An intermediate signal derived from the input signal contains in particular such a signal that is generated with the input signal by a sum or difference with other signals—for example a compensation signal for reducing acoustic feedback—and also a signal produced from the input signal by frequency-dependent amplification in accordance with audiological specifications for the user and/or by dynamic compression.

Other features which are considered as characteristic for the invention are set forth in the appended claims.

Although the invention is illustrated and described herein as embodied in a method for reducing noise in an audio signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts and sizes are assigned the same reference symbols in all drawings.

Figure 1:
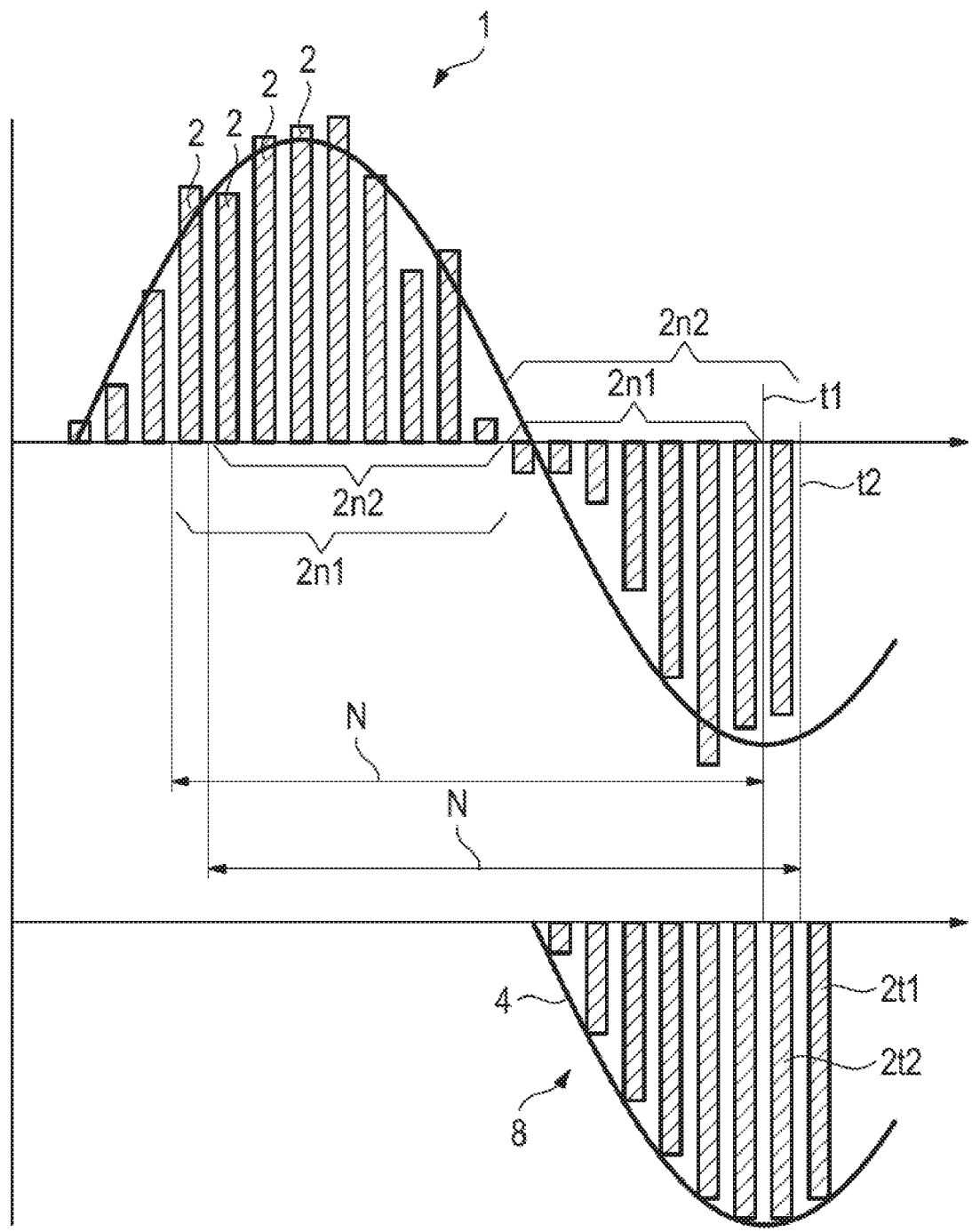
FIG. 1 is a graph showing a prediction of audio samples against a time axis with reference to a plurality of prior audio samples of an audio signal.

Referring now to the figures of the drawings in detail and first, particularly to FIG. 1 thereof, there is shown schematically an audio signal 1, plotted against a time axis t. The audio signal 1 in this case is available in digitized form, i.e. in the form of the audio samples 2. The amplitudes of the individual audio samples 2 approximately describe a sine curve 4, with the deviations from the sine curve 4 representing an additive noise on top of the useful signal, which is provided by the sound corresponding to the sine curve 4. The audio samples 2 of the audio signal 1 are only available up to a prediction time t1. The signal components 2n1 of the audio signal 1, which are given by the last N audio samples 2 prior to the prediction time t1, are now used for predicting the audio sample 2t1 immediately subsequent to the prediction time t1. This is done using a linear prediction filter of length N. The linear prediction determines the subsequent audio sample 2t1 from the correlations present in the signal components 2n1 that are used for the prediction. Uncorrelated statistical noise cannot be predicted in this case.

The aforementioned correlations are given here by the sine curve 4, so that the subsequent audio sample 2t1 is predicted according to the sine curve 4, and the additive noise, by which the amplitudes in the audio samples 2 deviate from the sine curve 4 prior to the prediction time t1, only leads to a small contribution due to the correlation being absent in the prediction. For the predicted audio sample 2t1, the result is almost the value of the amplitude of the sine wave 4, with small deviations from this value resulting from the finite filter length N and from residual correlations in additive noise.

The next prediction time t2 is selected at the end of the audio sample 2t1, and the audio sample 2t2 subsequent to the prediction time t2 is predicted in the manner just described, with reference to the signal components 2n2, which are again given by the last N audio samples 2 prior to the prediction time t2.

The predicted audio signal 8 is now formed from the predicted audio samples 2t1, 2t2, the progression of reproduces the sine curve 4 much better than the audio signal 1. The additive noise in the audio signal 1 has thus been considerably reduced by the prediction. The predicted audio signal 8 may now be used directly as a noise-reduced audio signal, if it may be assumed that the useful signal components in audio signal 1 are sufficiently correlated, and thus the prediction does not reduce any actually desired signal components during noise reduction. If, however, it may be assumed that the useful signal component in the audio signal 1 also has uncorrelated components, for purposes of compensation, a portion of audio signal 1 may be added to the predicted audio signal 8 to generate a noise-reduced audio signal. This emphasizes temporally correlated, i.e. in particular tonal, useful signal components of the audio signal 1, without wholly erasing the uncorrelated components of the useful signal. This emphasis also gives rise to a reduction in the uncorrelated noise.

Figure 2:
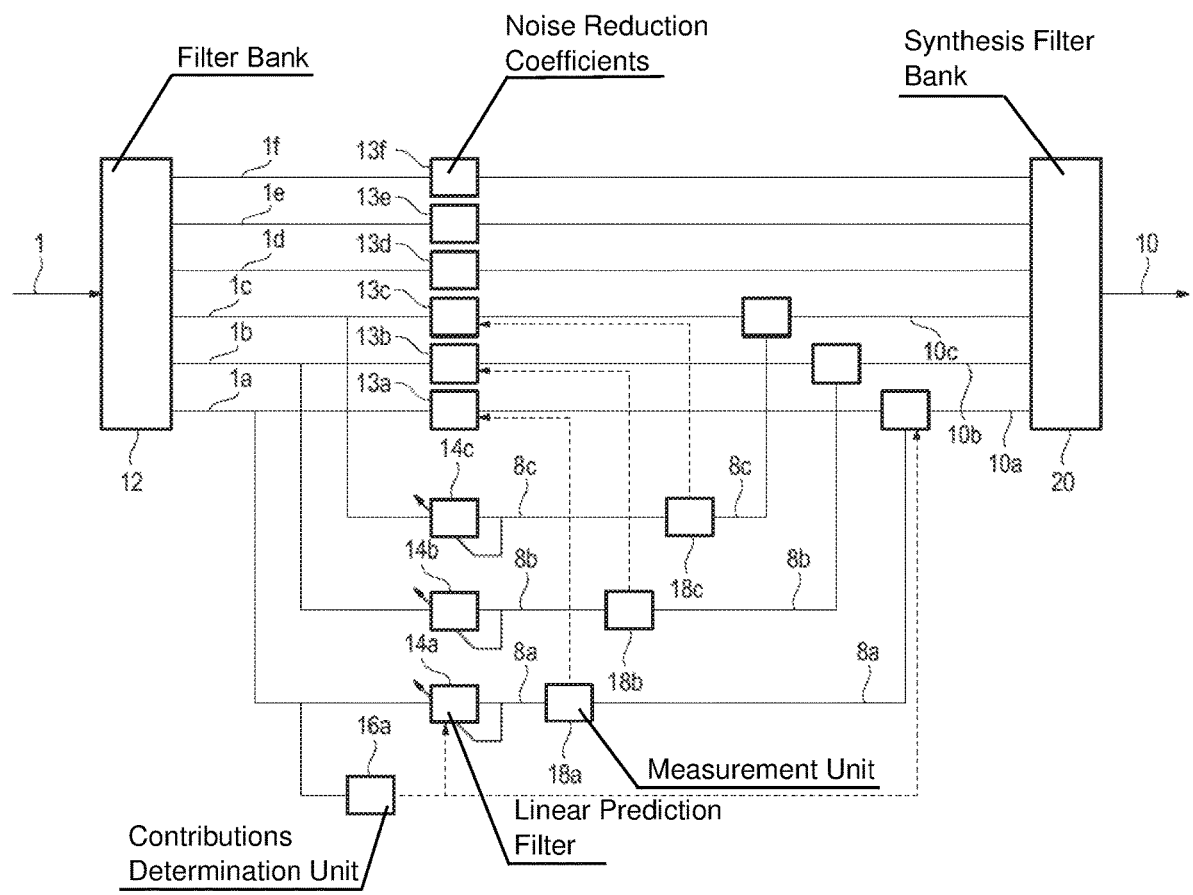
FIG. 2 is a block diagram for implementing a method for reducing noise in an audio signal using the prediction according to FIG. 1.

FIG. 2 shows a schematic block diagram of a method for reducing noise in an audio signal 1 using the prediction according to FIG. 1. The audio signal 1 is first decomposed into individual frequency bands 1a-f by a filter bank 12. For the frequency bands 1a-f of the audio signal 1, noise reduction coefficients 13a-f are now determined that, for a classical frequency-band-specific noise reduction, are multiplied by the signal component in the individual frequency band 1a-f. A predicted audio signal 8a-c is generated using the prediction noise reduction method shown in FIG. 1, with reference to the signal components in the first three frequency bands 1a-c.

The generation of the predicted audio signals 8a-c may be limited to the lower frequency bands 1a-c, because as frequency increases, the harmonic part of a useful signal that is a speech signal decreases, and signal components that represent unvoiced speech, such as corresponding consonants, increasingly dominate. However, such signal components are no longer distributed over the frequency spectrum in the harmonic structure, and as a result, the correlations required for the method shown in FIG. 1 are no longer as strong as those required in the case of harmonic components in lower frequency ranges. In this context, to avoid artifacts, the method of noise reduction shown in FIG. 1 is applied only to those frequency bands in which this method provides significant advantages with a sufficiently high degree of certainty.

This is shown in FIG. 2 with reference to frequency bands 1a-c; as a general matter, a corresponding application of the method should not be limited to the first three frequency bands, but additionally depends on the structure of the filter bank 12 and the resulting real number of frequency bands, and may also be determined dynamically with reference to the signal components in the individual frequency bands and in particular with reference to the proportion of harmonic signal components therein.

In this case, the filter coefficients of the prediction filter 14a-c, with reference to which the predicted audio signals 8a-c are generated, are determined adaptively as a function of the respective deviation of the predicted audio signal 8a-c from the corresponding original audio signal in the frequency band 1a-c. In addition, the proportion of contributions 16a from harmonic components in the respective frequency band is determined for each of the individual frequency bands 1a-c, for each of which a predicted audio signal 8a-c is generated. In the present case this is symbolically shown for the first frequency band 1a, but it may be done in particular for all frequency bands 1a-c in which a predicted audio signal 8a-c is generated. The length of the prediction filter 14a may be changed based on the contributions 16a of the harmonic components. A longer filter is preferred for a frequency band that has a greater number of harmonic components. This takes into account the circumstance that a plurality of harmonic components in a frequency band results in a superposition of these harmonic components with a potentially more complex periodicity behavior, which is why a longer filter and thus the use of more audio samples is advantageous for prediction. If, however, only one harmonic component is present, a smaller number of audio samples may suffice for prediction, and the length of the prediction filter 14a may be correspondingly reduced in order to reduce the complexity of the calculations.

In addition, for each predicted audio signal 8a-c, a measurement 18a is determined for the noise reduction in the respective predicted audio signal 8a-c, relative to the corresponding audio signal in the frequency band 1a-c. This is symbolically shown for the first frequency band 1a. For example, in this case, the measurement 18a may be performed by simply comparing the signal levels of the predicted audio signal 8a and the audio signal in the frequency band 1a, because it is assumed that the signal level is reduced precisely by noise reduction. The measurement 18a may be used to correct the noise reduction coefficient 13a, because it may be assumed that noise in the audio signal in the frequency band 1 is already reduced by the predicted audio signal 8a by the amount of the measurement 18a, and a corresponding additional reduction of the amplification in excess of the noise reduction coefficient 13a is therefore not necessary in the context of classical frequency-band-specific noise reduction. The described correction of the noise reduction coefficient 13a may be performed for those frequency bands 1a-c for which a predicted audio signal 8a-c is generated, and a measure of the noise reduction that occurs through prediction may be ascertained accordingly.

After applying the noise reduction coefficients 13a-c, the audio signal in the respective frequency bands 1a-c may be mixed with the relevant predicted audio signal 8a-c, thereby generating the noise-reduced audio signal 10a-c in the respective frequency band. The mixing ratio, i.e. how much of the predicted audio signal 8a-c is included in the noise-reduced audio signal 10a-c in this case, may in particular be determined as a function of the contributions 16a from harmonic components in the respective frequency band, which in the present case is symbolically depicted for the first frequency band 1a, but preferably occurs for all frequency bands 1a-c in which a predicted audio signal 8a-c is produced. Finally, the noise-reduced audio signals 10a-c and the audio signals of the frequency bands 1d-f that are noise-reduced with reference to the noise reduction coefficients 13d-f, may be transformed into a single noise-reduced audio signal 10 in the time domain via a synthesis filter bank 20.

Figure 3:
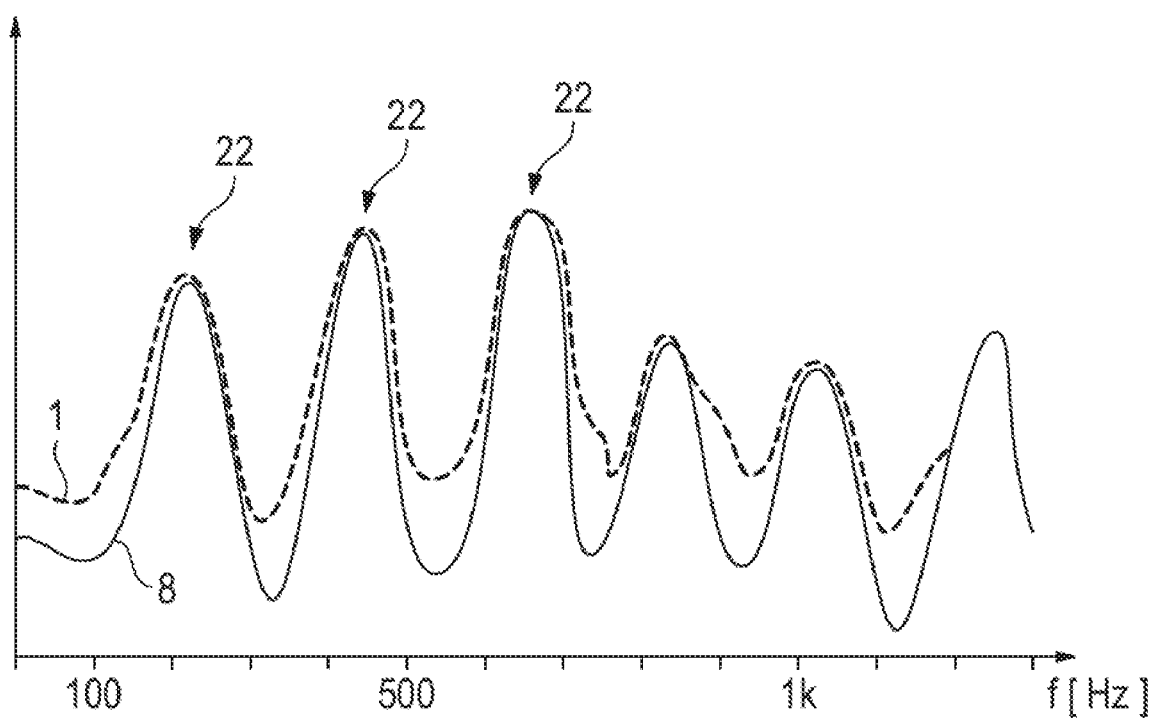
FIG. 3 is a graph showing a spectrum of a noisy audio signal having speech as a useful signal, and the same audio signal after noise reduction by the method according to FIG. 2.

FIG. 3 shows the spectrum of a noisy audio signal 1 (dashed line) against a frequency axis f, in which the useful signal components are provided by a speech signal. In the audio signal 1, an uncorrelated, broadband noise is superimposed on this speech signal. After applying the noise reduction method shown in FIG. 1 in this case, the predicted audio signal 8 (solid line) is obtained. Clearly visible are the harmonic components 22, which make substantially the same contributions both in the audio signal 1 and in the predicted audio signal 8. For the frequency ranges between the harmonic components 22, however, the predicted audio signal 8 shows a clear reduction of noise.

Figure 4:
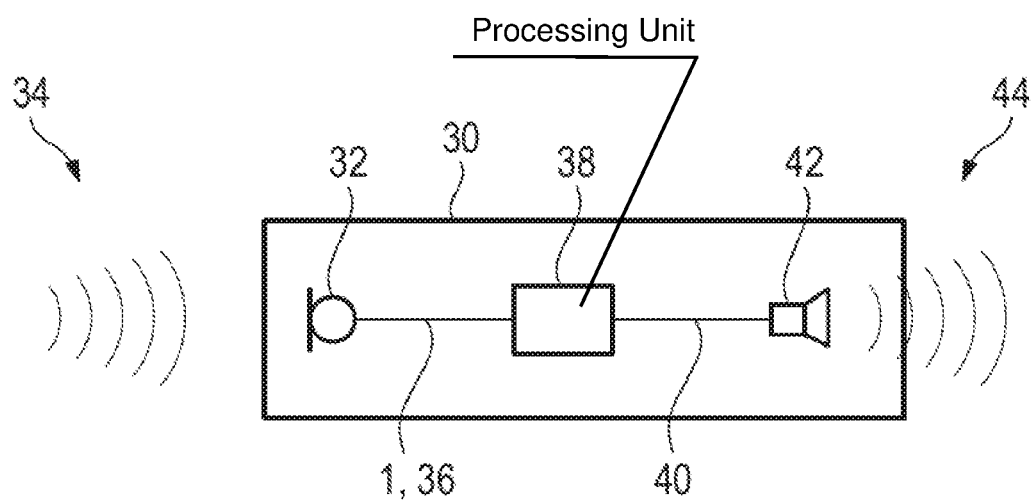
FIG. 4 is a block diagram of a hearing device.

FIG. 4 shows a schematic block diagram of a hearing device 30. An input transducer 32 of the hearing device 30, configured as a microphone, generates an input signal 36 from a sound signal 34 from the environment. The input signal 36 is fed to a signal processing unit 38, where it is processed in accordance with the audiological specifications of the user of the hearing device 30, and in particular is amplified in a frequency-band-dependent manner. The signal processing unit 38 generates a playback signal 40, which is converted into an output sound signal 44 by an output transducer 42 of the hearing device 30. The output transducer 42 in this present case is designed as a speaker. The method for reducing noise in an audio signal described with reference to FIG. 2 may here be applied in the signal processing unit 38 in particular to the audio signal 1 in the form of the input signal 36, or also to intermediate signals that are derived from the input signal 36 and may be generated by preprocessing the input signal 36 or also by suppressing acoustic feedback, not otherwise shown.

Although the invention has been illustrated and described in greater detail by means of the preferred exemplary embodiment, this exemplary embodiment does not limit the invention. A person of ordinary skill in the art may derive additional variations herefrom without departing from the protected scope of the invention.

The following is a summary list of reference numerals and the corresponding structure used in the above description of the invention:
1 Audio signal
1a-f Frequency bands
2 audio sample
2n1, 2n2 Signal component
2t1, 2t2 Predicted audio sample
4 Sine curve
8, 8a-c Predicted audio signal
10, 10a-f Noise-reduced audio signal
12 Filter bank
13a-f Noise reduction coefficient
14a-c Linear prediction filter
16a Contribution
18a Measure
20 Synthesis filter bank
22 Harmonic component
30 Hearing device
32 Input transducer
34 Sound signal
36 Input signal
38 Signal processing unit
40 Playback signal
42 Output transducer
44 Output sound signal
f Frequency
N Number of samples
t Time
t1, t2 Prediction time

The invention claimed is:

1. A method for reducing noise in an audio signal, which comprises the steps of:
predicting for a plurality of prediction times, a signal component subsequent to a prediction time with reference to signal components of the audio signal that are respectively prior to the prediction time;
decomposing the audio signal into a plurality of frequency bands, wherein the signal component subsequent to the prediction time is respectively predicted in a frequency-band-specific manner with reference to the signal components of the audio signal prior to the prediction time;
forming a predicted audio signal from the signal components respectively subsequent to the prediction time;
generating a noise-reduced audio signal based on the predicted audio signal by mixing the predicted audio signal with the signal components of the audio signal in a frequency-band-specific manner in order to generate the noise-reduced audio signal; and
determining a mixing ratio in dependence on contributions of harmonic components and/or contributions of uncorrelated components in a respective frequency band.

2. The method according to claim 1, which further comprises using a plurality of audio samples respectively prior to the prediction time for the signal components of the audio signal prior to the prediction time.

3. The method according to claim 1, which further comprises predicting in each case a plurality of audio samples, as the signal component subsequent to the prediction time, and a time reference subsequent to the prediction time is associated with each respective sample.

4. The method according to claim 1, wherein by means of a linear prediction filter, the signal component subsequent to the prediction time is respectively predicted with reference to the signal components of the audio signal prior to the prediction time.

5. The method according to claim 4, which further comprises determining filter coefficients of a linear prediction filter adaptively in dependence on a deviation of the predicted audio signal from the audio signal.

6. The method according to claim 1, which further comprises:
applying a noise reduction coefficient respectively in a frequency-band-specific manner to the signal components of the audio signal prior to the mixing; and determining the noise reduction coefficient in a respective frequency band with reference to a noise reduction performed in the predicted audio signal relative to the audio signal.

7. The method according to claim 1, which further comprises:
estimating a number of harmonic components for a number of the frequency bands; and
selecting a filter length of a linear prediction filter in dependence on a number of harmonic components in a frequency band.

8. A method for reducing noise in a hearing device, which comprises the steps of:
generating, via an input transducer of the hearing device, an input sound signal from a sound signal of an environment;
reducing a noise in the input signal and/or in an intermediate signal derived from the input signal by performing the further substeps of:
predicting for a plurality of prediction times, a signal component subsequent to a prediction time with reference to signal components of the input sound signal that are respectively prior to the prediction time;
decomposing the input sound signal into a plurality of frequency bands, wherein the signal component subsequent to the prediction time is respectively predicted in a frequency-band-specific manner with reference to the signal components of the input sound signal prior to the prediction time;
forming a predicted audio signal from the signal components respectively subsequent to the prediction time;
generating a noise-reduced audio signal based on the predicted audio signal by mixing the predicted audio signal with the signal components of the input sound signal in a frequency-band-specific manner in order to generate the noise-reduced audio signal; and
determining a mixing ratio in dependence on contributions of harmonic components and/or contributions of uncorrelated components in a respective frequency band; and
forming a playback signal of the hearing device with reference to the noise-reduced audio signal thus generated.

9. A hearing device, comprising:
an input transducer for generating an input signal; and
a signal processing unit configured to perform a method for reducing noise in the input signal, which comprises the steps of:
predicting for a plurality of prediction times, a signal component subsequent to a prediction time with reference to signal components of the input signal that are respectively prior to the prediction time;
decomposing the input signal into a plurality of frequency bands, wherein a signal component subsequent to the prediction time is respectively predicted in a frequency-band-specific manner with reference to the signal components of the input signal prior to the prediction time;
forming a predicted audio signal from the signal components respectively subsequent to the prediction time;
generating a noise-reduced audio signal based on the predicted audio signal by mixing the predicted audio signal with the signal components of the input signal in a frequency-band-specific manner in order to generate the noise-reduced audio signal; and
determining a mixing ratio in dependence on contributions of harmonic components and/or contributions of uncorrelated components in a respective frequency band.

* * * * *